United States Patent
Perrin et al.

(10) Patent No.: US 9,776,733 B2
(45) Date of Patent: Oct. 3, 2017

(54) METHOD AND DEVICE FOR ASSISTING IN THE LANDING OF AN AIRCRAFT IN A FLARE PHASE

(71) Applicants: Airbus (SAS), Blagnac (FR); Airbus Operations (SAS), Toulouse (FR)

(72) Inventors: Philippe Perrin, Toulouse (FR); Matthias Eberle, Tournefeuille (FR)

(73) Assignee: Airbus Operations (SAS), Toulouse (FR)

( * ) Notice: Subject to any disclaimer, the term of this patent is extended or adjusted under 35 U.S.C. 154(b) by 0 days.

(21) Appl. No.: 15/005,387

(22) Filed: Jan. 25, 2016

(65) Prior Publication Data

US 2016/0214736 A1    Jul. 28, 2016

(30) Foreign Application Priority Data

Jan. 28, 2015   (FR) ..................... 15 50654

(51) Int. Cl.
| | |
|---|---|
| B64D 45/04 | (2006.01) |
| B64D 47/02 | (2006.01) |
| B64D 45/00 | (2006.01) |
| G05D 1/06 | (2006.01) |
| G05D 1/08 | (2006.01) |
| G08G 5/00 | (2006.01) |
| G08G 5/02 | (2006.01) |

(52) U.S. Cl.
CPC ......... *B64D 45/04* (2013.01); *B64D 45/0005* (2013.01); *B64D 47/02* (2013.01); *G05D 1/0676* (2013.01); *G05D 1/085* (2013.01); *G08G 5/0021* (2013.01); *G08G 5/025* (2013.01)

(58) Field of Classification Search
CPC .... B64D 45/04; B64D 45/0005; B64D 47/02; G08G 5/025; G08G 5/0021; G05D 1/085; G05D 1/0676
See application file for complete search history.

(56) References Cited

U.S. PATENT DOCUMENTS

| | | | |
|---|---|---|---|
| 3,327,973 A | 6/1967 | Kramer et al. | |
| 3,604,908 A | 9/1971 | Loome et al. | |
| 4,057,782 A | 11/1977 | Muller | |

(Continued)

FOREIGN PATENT DOCUMENTS

| | | |
|---|---|---|
| CA | 2843657 | 10/2014 |
| EP | 0674300 | 9/1995 |
| FR | 2347656 | 11/1977 |

OTHER PUBLICATIONS

French Search Report, Dec. 16, 2015.

*Primary Examiner* — Anne M Antonucci
(74) *Attorney, Agent, or Firm* — Greer, Burns & Crain, Ltd.

(57) ABSTRACT

A device for assisting in the landing of an aircraft in a flare phase comprising a control stick, a first unit for acquiring current flight parameters of the aircraft, a second unit for acquiring a current deflection angle of the control stick, a computation unit for computing a difference between the current deflection angle of the control stick and a target deflection angle of the control stick, and an acoustic emission unit configured to automatically emit a warning or guidance sound signal in the cockpit of the aircraft, according to the difference between the current deflection angle and the target deflection angle of the control stick.

15 Claims, 2 Drawing Sheets

(56) References Cited

U.S. PATENT DOCUMENTS

| | | | | |
|---|---|---|---|---|
| 4,619,110 A | * | 10/1986 | Moore | F02C 9/28 |
| | | | | 60/39.091 |
| 5,170,163 A | | 12/1992 | Collins et al. | |
| 5,608,392 A | | 3/1997 | Faivre et al. | |
| 8,374,736 B1 | | 2/2013 | Rupnik | |
| 8,831,799 B1 | | 9/2014 | Levine et al. | |
| 2009/0189786 A1 | * | 7/2009 | Fabas | G01C 23/00 |
| | | | | 340/963 |
| 2013/0201082 A1 | | 8/2013 | Larson | |

* cited by examiner

METHOD AND DEVICE FOR ASSISTING IN THE LANDING OF AN AIRCRAFT IN A FLARE PHASE

CROSS-REFERENCES TO RELATED APPLICATIONS

This application claims the benefit of the French patent application No. 15550654 filed on Jan. 28, 2015, the entire disclosures of which are incorporated herein by way of reference.

BACKGROUND OF THE INVENTION

The present invention relates to a method and a device for assisting in the landing of an aircraft, in particular a transport airplane, in a flare phase.

When landing an aircraft, to perform a flare maneuver manually, the pilot of the aircraft has to actuate a control stick, this actuation having to be performed in such a way that the impact of the aircraft with the ground is made in a flexible manner. Executing this flare maneuver in total safety requires a certain flying experience on the part of the pilot. In effect, the actuation of the control stick is based on the view of the pilot of the environment of the aircraft, of flight parameters indicated in the cockpit, and of acoustic parameters such as the noise of the engine or the wind. The attention of the pilot thus has to switch from the piloting instruments to the runway and back again a very great number of times within a short time period.

In order to assist the pilot, there are devices available that make it possible to display a maximum amount of useful information in a head-up display (HUD). However, not all aircraft are equipped with such devices.

Also known are devices designed to prevent the vertical speeds of the aircraft on impact on the runway being greater than a predetermined value, generally 8 feet per second (approximately 2.4 meters per second), if the pilot does not perform the manual flare maneuver correctly. Now, this vertical speed limit of 8 feet per second (approximately 2.4 meters per second) is extremely high, relative to the usual vertical speed target of 2.5 feet per second (approximately 0.76 meters per second). This limit cannot however be less since it would make the device too intrusive in the freedom of maneuver of the pilot.

It is known practice, from the document U.S. Pat. No. 8,831,799, to compute a fixed flare starting from a fixed geographic point and to lock the aircraft along the trajectory corresponding to this flare. This trajectory does, however, remain fixed until the impact of the aircraft on the landing runway. This solution requires the pilot to follow a given trajectory and to adapt his or her piloting technique to follow this trajectory. This solution is not therefore satisfactory.

SUMMARY OF THE INVENTION

An object of the present invention is to remedy this drawback. It relates to a method for assisting in the landing of an aircraft in a flare phase, the aircraft comprising at least one control stick configured to be able to be actuated by a pilot in order to control the aircraft according to at least one pitch axis.

To this end, according to the invention, the method for assisting in the piloting of an aircraft is noteworthy in that it comprises the following sequence of steps, implemented repetitively and automatically during a flight of the aircraft:

a first acquisition step to perform the real-time acquisition of current flight parameters of the aircraft;

a second acquisition step to perform the real-time acquisition of a current deflection angle of the control stick;

a computation step to compute, in real-time, the difference between the current deflection angle of the control stick and a target deflection angle of the control stick dependent on the current flight parameters and on a target vertical speed on impact; and a step of acoustic emission to emit a sound signal in the cockpit of the aircraft according to the difference between the current deflection angle and the target deflection angle of the control stick.

Thus, by virtue of the invention, the trajectory making it possible to achieve the target vertical speed is permanently reupdated, for example every 40 milliseconds, to best adapt to the piloting conditions of the pilot and to the flight conditions, thus making it possible to remedy the above-mentioned drawback. Furthermore, the pilot is guided acoustically during the flare phase so as to land with the appropriate vertical speed. The pilot therefore no longer has to switch his or her gaze repeatedly between the outside of the aircraft and the instruments of the cockpit to obtain the relevant guidance information.

According to different embodiments of the invention, which can be taken together or separately:

the method comprises a step prior to the sequence of steps, comprising acquiring the target vertical speed;
the sound signal comprises:
at least one acoustic signal;
at least one voice; or
a combination of at least one acoustic signal and of at least one voice;
the acoustic emission step is a warning step, the sound signal comprising at least one sound emitted to indicate that the difference between the current deflection angle and the target deflection angle is greater than a predetermined value;
the acoustic emission step is configured to emit, if appropriate, one of the following plurality of sounds defining the sound signal:
a first sound to indicate that the control stick exhibits a current deflection angle greater than the target deflection angle; and
a second sound to indicate that the control stick exhibits a current deflection angle less than the target deflection angle;
the acoustic emission step is a guidance step, the sound signal being a sound varying according to the difference between the current deflection angle and the target deflection angle;
the sound variation corresponds to a frequency and/or pulse variation;
the computation step comprises a computation substep comprising computing a vertical speed on impact predicted from the current deflection angle and from current flight parameters of the aircraft, the difference corresponding to the difference between the current deflection angle and the target deflection angle resulting from the difference between the predicted vertical speed and the target vertical speed;
the computation step comprises a computation substep comprising computing a flare making it possible to achieve the target vertical speed on impact from the current deflection angle and from current flight parameters of the aircraft, the difference corresponding to the difference between the current deflection angle and the target deflection angle resulting from the difference between a current vertical speed and a set point vertical speed for the flare thus computed at the current position of the aircraft;

the computation step uses:

a digital integration;

at least one precomputed trajectory of the aircraft; or at least one analytical computation of at least one trajectory of the aircraft.

The present invention relates also to a device for assisting in the landing of an aircraft in a flare phase, the device comprising at least one control stick configured to be able to be actuated by a pilot in order to control the aircraft according to at least one pitch axis.

According to the invention, the device is noteworthy in that it comprises:

a first acquisition unit configured to perform the automatic acquisition in real time of current flight parameters of the aircraft;

a second acquisition unit configured to perform the automatic acquisition in real time of a current deflection angle of the control stick;

a computation unit configured to automatically compute, in real time, the difference between the current deflection angle of the control stick and a target deflection angle of the control stick dependent on the current flight parameters and on a target vertical speed on impact; and an acoustic emission unit configured to automatically emit a sound signal in the cockpit of the aircraft according to the difference between the current deflection angle and the target deflection angle of the control stick.

Advantageously, the acoustic emission unit is configured to be able to emit a plurality of sounds in the cockpit, including the sound signal, the acoustic emission unit comprising an auxiliary element configured to, when two sound emissions have to be generated simultaneously, establish a priority between the sounds so as to prioritize the emission of the sound of the highest priority.

The present invention further relates to an aircraft, in particular a transport airplane, which is provided with such a landing assistance device.

BRIEF DESCRIPTION OF THE DRAWINGS

The attached figures will give a good understanding of how the invention can be produced. In these figures, identical references denote similar elements.

DETAILED DESCRIPTION OF THE PREFERRED EMBODIMENTS

Figure 1:
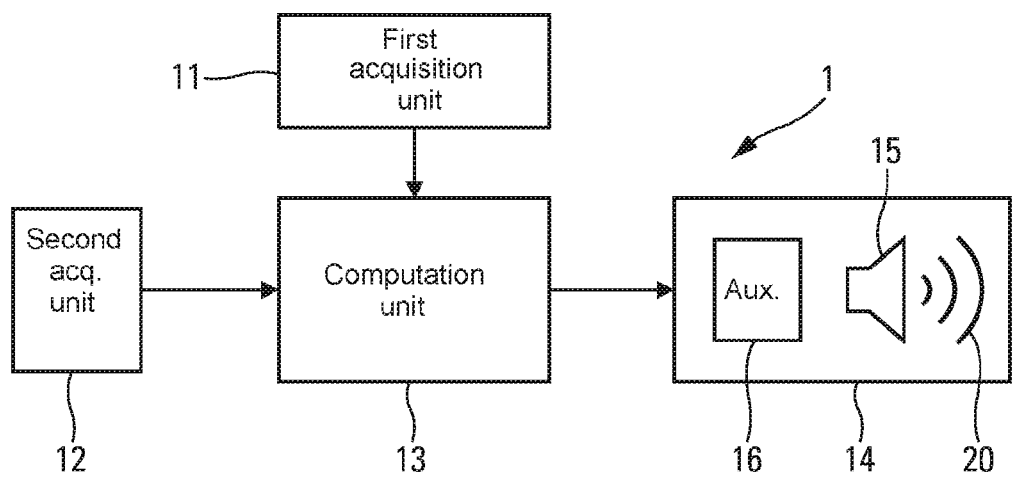
FIG. 1 is the block diagram of a landing assistance device which illustrates an embodiment of the invention.

The device 1 for assisting in the landing in a flare phase of an aircraft (AC in FIG. 2), in particular of a transport airplane, is represented schematically in FIG. 1. This device 1 comprises a control stick (referenced 2 in FIG. 2) configured to be able to be actuated by a pilot in order to control the aircraft according to at least one pitch axis. The control stick 2 enables the pilot to control the movement of the aircraft according to its pitch axis. Standard control means for landing in manual mode other than the control stick 2 could of course be used without departing from the scope of the invention.

According to the invention, the device 1, which is embedded on the aircraft, comprises, as represented in FIG. 1:

a first acquisition unit 11 configured to perform the automatic acquisition, in real time, of current flight parameters of the aircraft;

a second acquisition unit 12 configured to perform the automatic acquisition, in real time, of a current deflection angle of the control stick;

a computation unit 13 configured to automatically compute, in real time, the difference between the current deflection angle of the control stick and a target deflection angle of the control stick dependent on the current flight parameters and on a target vertical speed (or descent speed) on impact; and an acoustic emission unit 14 configured to automatically emit a sound signal in the cockpit of the aircraft according to the difference between the current deflection angle and the target deflection angle of the control stick.

The device 1 thus permanently acquires the current flight parameters and recomputes the difference between the current deflection angle of the control stick and a target deflection angle of the control stick, for example every 40 milliseconds, such that the sound signal emitted is permanently reupdated.

The acoustic emission unit 14 comprises at least one loudspeaker 15 through which the sound signal is emitted in the cockpit of the aircraft, as illustrated by a symbol 20 in FIG. 1.

The target vertical speed is either acquired automatically by the device 1 from an embedded system (not represented), or entered manually by the pilot using a standard input means (touchscreen, control ball, keyboard, etc.). It is for example 2.5 feet per second (approximately 0.76 meters per second).

The sound signal can comprise:

at least one artificially created acoustic signal;

at least one voice; or a combination of at least one acoustic signal and of at least one voice.

By virtue of the emission of the sound signal in the cockpit of the aircraft, the device 1 makes it possible to warn and/or guide the pilot in order for him or her to control the control stick to bring it to the target deflection angle, without having to focus visually on instruments such as displays or indicators of the cockpit, so as to obtain an impact of the aircraft with the ground at the desired vertical speed (target descent speed).

In a first exemplary embodiment, the emission of the sound signal represents a warning to alert the pilot in the case where the deflection angle of the control stick differs too much from the target deflection angle.

Figure 2:
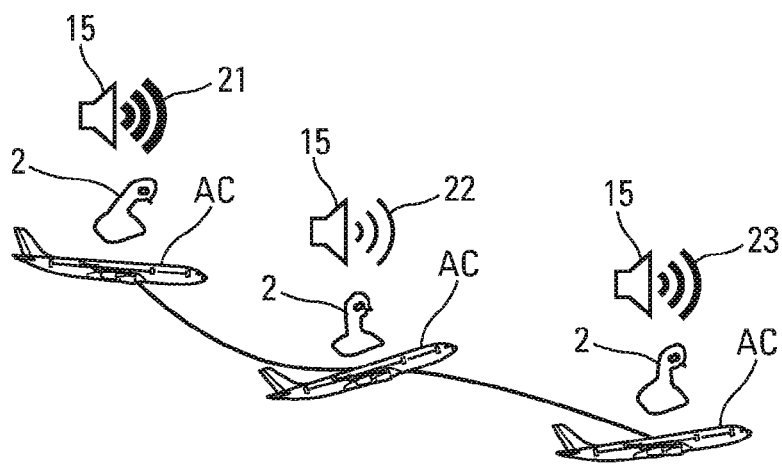
FIG. 2 schematically illustrates three different positions of an aircraft relative to its pitch axis.

Such an example is illustrated in FIG. 2 showing three successive situations from left to right. In this case, the sound signal comprises at least one sound emitted to indicate, if appropriate, that the difference between the current deflection angle and the target deflection angle is greater than a predetermined value. In this exemplary embodiment, the device is configured to emit, if appropriate:

a first sound 21 to indicate that the control stick 2 exhibits a current deflection angle $\alpha c$ greater than the target deflection angle $\alpha t$;

a second sound 22 to indicate that the control stick 2 exhibits a current deflection angle αc less than the target deflection angle αt; and a third sound 23 to indicate that the control stick 2 exhibits a current deflection angle αc equal or close (to within a predefined margin) to the target deflection angle αt.

Thus, in the first situation, the pilot has pushed the control stick 2 such that the current deflection angle αc is greater than the target deflection angle αt. The device 1 detects that this difference is leading to a vertical speed greater than a limit and warns the pilot with the first sound 21.

Subsequently, the pilot reacts and pulls on the control stick 2 too much. The current deflection angle αc becomes less than the target deflection angle αt. This difference is detected by the device 1 and the second sound 22 is emitted.

In the third situation, the pilot aligns the current deflection angle αc with the target deflection angle αt making it possible to obtain the target vertical speed. In this case, the device 1 can remain mute, that is to say not emit any sound signal, or else emit the third sound 23.

The first sound 21 is, for example, emitted when the current deflection angle αc exceeds a first predetermined value D1 greater than the target deflection angle αt.

Similarly, the second sound 22 is, for example, emitted when the current deflection angle is less than a second predetermined value D2 less than the target deflection angle. Thus:

when αc>D1, the first sound 21 is emitted;
when D2≤αc≤D1, the third sound 23 is emitted;
when αc<D2, the second sound 22 is emitted.

In a second exemplary embodiment (in addition to or as a variant of the first exemplary embodiment described above), the sound signal can be emitted by the device 1 to make it possible to guide the pilot in his or her actuation of the control stick 2 for him or her to make the current deflection angle αc of the control stick 2 correspond to the target deflection angle αt, that is to say for him or her to make the difference between these two angles tend toward zero.

Figure 3:
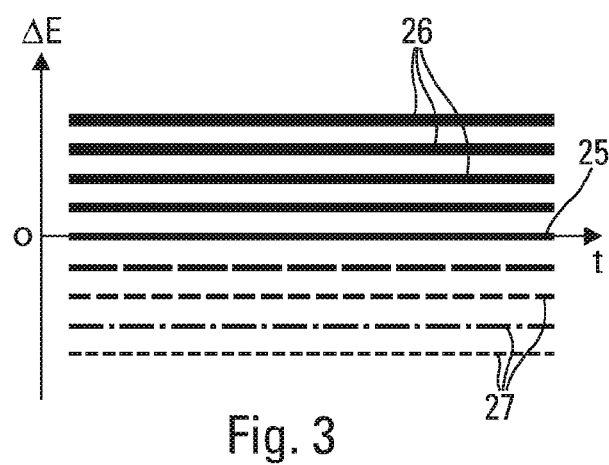
FIG. 3 is a graph representing different sounds emitted by the landing assistance device.

Such an example is illustrated in FIG. 3. According to this example, the sound signal is a sound varying according to the difference between the current deflection angle αc and the target deflection angle αt.

In this case, two parameters can assist the pilot in better identifying the difference between the current deflection angle αc and the target deflection angle αt: the frequency of the tone and the pulse duration. Thus, the sound variation corresponds to a frequency and/or pulse variation.

As illustrated in FIG. 3, by starting from a zero difference ΔE (represented by the line 25) and by increasing the value of the current deflection angle relative to the target deflection angle, the frequency increases (or decreases). This increase in frequency is illustrated by the increase in thickness of the lines 26. Conversely, by starting from a zero difference ΔE and by reducing the value of the deflection angle, the frequency varies in the reverse direction, that is to say that it decreases (or increases). This decrease is illustrated by the decrease in thickness of the lines 27. Furthermore, the pulse duration of the sound can also change by becoming, for example, increasingly short, when the difference ΔE decreases from a zero value, as illustrated by the broken lines 27.

Thus, the device guides the pilot, who perceives this sound variation, to the target deflection angle αt.

The computation unit 13 can compute the difference between the current deflection angle and the target deflection angle by a number of methods. Two variants are presented hereinbelow, illustrated in FIGS. 4 and 5.

Figure 4:
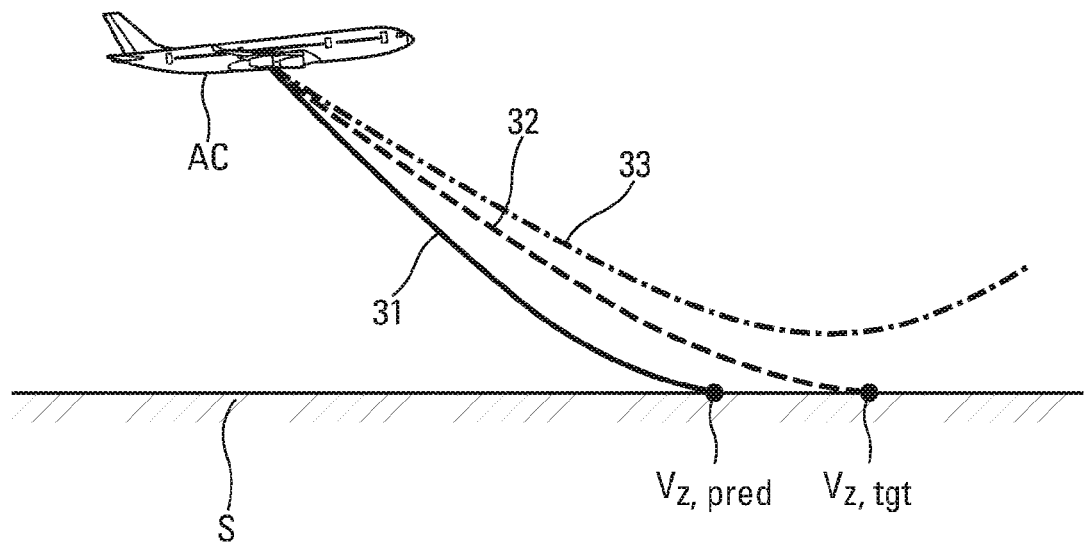
FIG. 4 schematically illustrates a first flare computation variant.

According to the first computation variant illustrated in FIG. 4, the aim is to estimate the vertical speed on impact $v_{z,tgt}$ according to the current deflection angle αc. The device 1 computes a predicted vertical speed on impact $v_{z,pred}$ from the current deflection angle αc and from current flight parameters of the aircraft. The difference ΔE corresponding to the difference between the current deflection angle and the target deflection angle results from the difference Δε between the predicted vertical speed $v_{z,pred}$ and the target vertical speed $v_{z,tgt}$:

$$\Delta\epsilon = v_{z,pred} - v_{z,tgt} \quad (1)$$

The device makes it possible to compute the predicted vertical speed on impact $v_{z,pred}$ by integration of the aircraft movement equations.

Three computation examples are illustrated in FIG. 4.

The first computation example defines a first flare 31 leading to a vertical speed on impact $V_{z,pred}$ greater than that of the second flare 32 corresponding to the target vertical speed $v_{z,tgt}$, that is to say to the target deflection angle αt. The reason for the impact with a greater vertical speed is that the current deflection angle αc of the control stick 2 is greater than the target deflection angle αt.

The device can also provide an equivalent parameter for the vertical speed on impact if the pilot pulls the control stick too much such that the aircraft will follow a trajectory that does not make it touch the ground S as illustrated by the third flare 33. Such an equivalent parameter can be the height of the lowest point above the ground S of the flare 33.

The second computation variant provides for reversing the mode of computation, that is to say, from the ground S to the aircraft AC. According to this variant illustrated in FIG. 5, the device is configured to compute a flare 41 making it possible to achieve the target vertical speed $v_{z,tgt}$ on impact from the current deflection angle αc and from current flight parameters of the aircraft. The difference ΔE corresponding to the difference between the current deflection angle and the target deflection angle results from the difference Δε between a current vertical speed $v_z$ and a set point vertical speed $v_{z,cmd}$ for the flare 41 thus computed at the current position of the aircraft AC:

$$\Delta\epsilon = v_z - v_{z,cmd} \quad (2)$$

In accordance with this computation variant, a trajectory is computed from the target vertical speed on impact $v_{z,tgt}$. Then, the aircraft movement equations are solved in the reverse direction. This makes it possible for the device to compute a flare that is valid for all the current deflection angles αc of the control stick 2, without having to manage the particular cases leading to a flare that does not touch the ground as indicated previously. Based on the trajectory 41 obtained, the device emits the appropriate sound signal to enable the pilot to find the target deflection angle αt to land at the target vertical speed $v_{z,tgt}$.

It will be understood here that the flare is not fixed but slides in geographic space if the pilot does not follow it in order to best adapt to the piloting thereof.

The computation unit 13 thus makes it possible to deduce the error (or difference) ΔE from:

the difference Δε between the vertical speed $v_{z,pred}$ on impact and the target vertical speed $v_{z,tgt}$ (equation (1) above); or the difference $\Delta\epsilon$ between the current vertical speed of the aircraft $v_z$ and the vertical speed $v_{z,cmd}$ of the flare for the current altitude of the aircraft above the ground (equation (2) above).

In order to compute the difference between the current deflection angle and the target deflection angle $\Delta E$, the computation unit 13 receives, for example, the target vertical speed $v_{z,tgt}$ on impact, the load factor $n_{z,pilot}$ perceived by the pilot, the height z of the aircraft above the surface of the ground S and the current vertical speed $v_z$ of the aircraft.

Then, the difference $\Delta E$ is transferred to the acoustic emission unit 14 to define and emit the sound signal.

Moreover, in a particular embodiment, the acoustic emission unit 14 is configured to be able to emit, in the cockpit, a plurality of sounds controlled by different systems of the aircraft, including the sound signal controlled by the computation unit 13. The acoustic emission unit 14 comprises, as represented in FIG. 1, an auxiliary element 16 configured to, when two sound emissions have to be generated simultaneously, establish a priority between the sounds and control the loudspeaker 15 for it to prioritize the emission (first or on its own) of the sound of the highest priority. In this case, the acoustic emission unit 14 can coordinate all the warnings and the acoustic sounds which are emitted in the cockpit.

The device 1 (and in particular the acoustic emission unit 14) can be connected, before the initiation of the flare, to other sources of relevant information to assist the pilot in performing this approach.

Instead of having the device operate only for the relatively short duration of the flare maneuver, it is also possible within the scope of the present application to activate the device before the initiation of the flare. This enables the pilot to become used to the sound signal and to different variations of the sound.

For example, the fact of keeping the aircraft stabilized on a descent trajectory of ILS (instrument landing system) type can be facilitated by the device 1 which then emits a sound signal making it possible to minimize the deviation of the aircraft from this trajectory.

In order to compute the difference between the current deflection angle $\alpha c$ and the target deflection angle $\alpha t$, the computation unit 13 (FIG. 1) uses:
 a digital integration;
 at least one precomputed trajectory of the aircraft; or
 at least one analytical computation of at least one trajectory of the aircraft.

In particular, the analytical computation offers the advantages of a low computation load for the device 1, of a low memory requirement and of high reliability.

The deflection angle of the control stick is directly linked to the load factor $n_{z,pilot}$ of the aircraft. Indeed, the pilot immediately increases the load factor if he or she pulls on the control stick, and he or she decreases the load factor if he or she pushes on the control stick assuming that the aircraft is operating in the typical landing flight domain. Consequently, the load factor $n_{z,pilot}$ can also be used as a control parameter to determine the flare maneuver instead of the deflection angle of the control stick.

Figure 5:
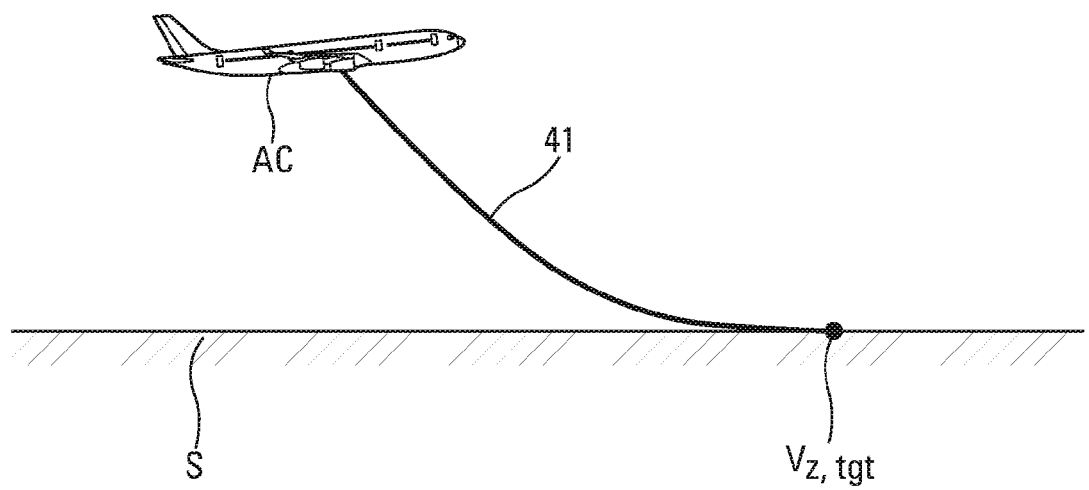
FIG. 5 schematically illustrates a second flare computation variant.

In the second variant illustrated in FIG. 5, by replacing the deflection angle by the load factor, the following equation is obtained:

$$v_{z,cmd} = -\sqrt{v_{z,tgt}^2 + 2 \cdot g \cdot n_{z,pilot} \cdot z} \quad (3)$$

Although this equation is fairly simple, its result is continually updated. There is no problem in using this equation for positive load factors and a height z greater than zero. An uninterrupted guidance can thus be ensured.

Instead of using complicated digital integration algorithms which can fail in certain conditions, simple equations like the equation (3) always generate a sound guidance signal which can be emitted by the device 1.

The device 1 can compute a flare based on the energy conservation law. The total energy of an aircraft moving relative to the ground is (disregarding the rotation energy) made up of the kinetic energy $E_{kin}$ and the potential energy $E_{pot}$:

$$E = E_{kin} + E_{pot} \quad (a)$$

or $$E = \tfrac{1}{2} \cdot m \cdot v_{z,cmd}^2 + mgz \quad (b)$$

in which m is the mass of the aircraft and g the gravity on earth.

If it is assumed that the total energy during the flare is conserved in time, the following is obtained:

$$gz + \tfrac{1}{2} v_{z,cmd}^2 = \tfrac{1}{2} v_{z,tgt}^2 \quad (c)$$

This relation is equivalent to:

$$\tfrac{1}{2} v_{z,cmd}^2 = \tfrac{1}{2} v_{z,tgt}^2 - gz \quad (d)$$

or $$v_{z,cmd} = -\sqrt{v_{z,tgt}^2 - 2gz} \quad (e)$$

There must be a "minus" sign before the square root because $v_{z,cmd}$ must have a negative impact on touchdown of the aircraft on the ground (z=0). The acceleration $\alpha_{z,cmd}$ along the trajectory is:

$$a_{z,cmd} = \frac{dv_{z,cmd}}{dt} \quad (f)$$

$$a_{z,cmd} = -\frac{1}{2} \cdot (v_{z,tgt}^2 - 2gz)^{-\frac{1}{2}} \cdot (-2g) \cdot v_{z,cmd} \quad (g)$$

$$a_{z,cmd} = g \cdot v_{z,cmd} \cdot (v_{z,tgt}^2 - 2gz)^{-\frac{1}{2}} \quad (h)$$

On impact, the equation 0 is obtained:

$$v_{z,cmd} = -|v_{z,tgt}| \quad (i)$$

Therefore, considering the equation 0, the acceleration on impact $\alpha_{z,tgt}$ is equal to:

$$\alpha_{z,tgt} = -g \quad (j)$$

This makes is possible to reformulate the equation 0 as:

$$v_{z,cmd} = -\sqrt{v_{z,tgt}^2 + 2 \cdot \alpha_{z,tgt} \cdot z} \quad (k)$$

and to use the parameter $\alpha_{z,tgt}$ to impose a definable target descent acceleration which can be used for the acoustic guidance. Thus, the acceleration along the flare is:

$$\alpha_{z,cmd} = -\alpha_{z,tgt} v_{z,cmd} \cdot (v_{z,tgt}^2 + 2 \cdot \alpha_{z,tgt} \cdot z)^{-1/2} \quad (l)$$

Setting the height z equal to zero to check the accuracy of the equations reveals that the descent acceleration is $\alpha_{z,tgt}$ in the case where the pilot follows the target and establishes the vertical speed $-|v_{z,tgt}|$.

Instead of using the target descent acceleration $\alpha_{z,tgt}$ on impact, it is possible, in an equivalent manner, to use the target load factor $n_{z,tgt}$. The parameters are linked by the following equation:

$$\alpha_{z,tgt} = g \cdot n_{z,tgt} \quad (m)$$

Therefore, the equation 0 is written:

$$\upsilon_{z,cmd} = -\sqrt{\upsilon_{z,tgt}^2 + 2 \cdot g \cdot n_{z,tgt} \cdot z} \quad (n)$$

Instead of using the vertical speed $\upsilon_{z,cmd}$, it is possible, alternatively, to use the flight trajectory angle $$\gamma_c = \arctan\left(\frac{v_{z,cmd}}{v_{gnd}}\right)$$

for the guidance:

$$\gamma_c = \arctan\left(-\frac{1}{v_{gnd}} \cdot \sqrt{v_{z,tgt}^2 + 2 \cdot g \cdot n_{z,tgt} \cdot z}\right) \quad (o)$$

in which $\upsilon_{gnd}$ is the ground speed.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A method for assisting in the landing of an aircraft in a flare phase, said aircraft comprising at least one control stick configured to be able to be actuated by a pilot in order to control the aircraft according to at least one pitch axis, said method comprising the following sequence of steps, implemented repetitively and automatically during a flight of the aircraft:
    acquiring, in real-time, current flight parameters of the aircraft;
    acquiring, in real-time, current deflection angle of the control stick;
    determining a target deflection angle of the control stick dependent on said current flight parameters and on a target vertical speed on impact;
    comparing the target deflection angle of the control stick with the current deflection angle of the control stick to determine a difference between the current deflection angle and the target deflection angle of the control stick;
    acoustically emitting a sound signal in the cockpit of the aircraft, according to said difference between the current deflection angle and the target deflection angle of the control stick; and,
    after a predetermined amount of time, re-determining the target deflection angle of the control stick and comparing the target deflection angle of the control stick with the current deflection angle of the control stick.

2. The method as claimed in claim 1, further comprising: acquiring said target vertical speed.

3. The method as claimed in claim 1, in which the sound signal comprises:
    at least one acoustic signal;
    at least one voice; or
    a combination of at least one acoustic signal and at least one voice.

4. The method as claimed in claim 1, in which the sound signal is a warning comprising at least one sound emitted to indicate that said difference between the current deflection angle and the target deflection angle is greater than a predetermined value.

5. The method as claimed in claim 4, in which the sound signal comprises:
    a first sound to indicate that the control stick exhibits a current deflection angle greater than the target deflection angle; and
    a second sound to indicate that the control stick exhibits a current deflection angle less than the target deflection angle.

6. The method as claimed in claim 1, in which the sound signal is a guidance sound, said sound signal being a sound varying according to said difference between the current deflection angle and the target deflection angle.

7. The method as claimed in claim 6, in which the sound variation corresponds to at least one of a frequency or a pulse variation.

8. The method as claimed in claim 1, further comprising:
    determining a vertical speed on impact predicted from the current deflection angle and from current flight parameters of the aircraft, said difference corresponding to the difference between the current deflection angle and the target deflection angle resulting from the difference between the predicted vertical speed and the target vertical speed.

9. The method as claimed in claim 1, further comprising:
    determining a flare from which the target vertical speed on impact from the current deflection angle and from current flight parameters of the aircraft is able to be achieved, said difference corresponding to the difference between the current deflection angle and the target deflection angle resulting from the difference between a current vertical speed and a set point vertical speed for the flare thus computed at the current position of the aircraft.

10. The method as claimed in claim 1, in which determine a difference between the current deflection angle and the target deflection angle of the control stick uses:
    a digital integration;
    at least one precomputed trajectory of the aircraft; or
    at least one analytical computation of at least one trajectory of the aircraft.

11. A device for assisting in the landing of an aircraft in a flare phase, said device comprising:
    at least one control stick configured to be able to be actuated by a pilot in order to control the aircraft according to at least one pitch axis; and,
    a speaker configured to emit a sound signal in the cockpit of the aircraft;
    wherein the device is configured to determine a target deflection angle of the control stick dependent on current flight parameters and on a target vertical speed on impact and compare the target deflection angle of the control stick with the current deflection angle of the control stick, and, after a predetermined amount of time, re-determine the target deflection angle of the control stick and comparing the target deflection angle of the control stick with the current deflection angle of the control stick, and, when there is difference between the target deflection angle of the control stick and the current deflection angle of the control stick, the sound signal is emitted in the cockpit via the speaker.

12. The device as claimed in claim 11, where in the device is configured to emit a plurality of sounds in the cockpit, including said sound signal, said device further comprising an auxiliary element configured to, when two sound emissions have to be generated simultaneously, establish a priority between said sounds so as to prioritize the emission of the sound of the highest priority.

13. A method for assisting in the landing of an aircraft in a flare phase, said aircraft comprising at least one control stick configured to be able to be actuated by a pilot in order to control the aircraft according to at least one pitch axis, said method comprising the following sequence of steps, implemented repetitively and automatically during a flight of the aircraft:
   acquiring, in real-time, current flight parameters of the aircraft;
   acquiring, in real-time, a current deflection angle of the control stick;
   determining a target deflection angle of the control stick dependent on said current flight parameters and on a target vertical speed on impact;
   comparing the target deflection angle of the control stick with the current deflection angle of the control stick to determine a difference between the current deflection angle and the target deflection angle of the control stick;
   acoustically emitting a first sound signal in the cockpit of the aircraft, if said difference between the current deflection angle and the target deflection angle of the control stick and emitting a second sound signal in the cockpit of the aircraft, if said difference between the current deflection angle and the target deflection angle of the control stick; and,
   after a predetermined amount of time, re-determining the target deflection angle of the control stick and comparing the target deflection angle of the control stick with the current deflection angle of the control stick.

14. The method of claim 13 wherein a frequency or a pulse variation of at least one of said first sound signal and second sound signal varies depending on said difference between the current deflection angle and the target deflection angle.

15. The method of claim 13 wherein a frequency or a pulse variation of said first sound signal and said second sound signal varies depending on said difference between the current deflection angle and the target deflection angle.

* * * * *